United States Patent [19]

Tsutsumikoshi et al.

[11] Patent Number: 4,535,869
[45] Date of Patent: Aug. 20, 1985

[54] SADDLE RIDING TYPE MOTORCAR HAVING FOUR WHEELS

[75] Inventors: Shinobu Tsutsumikoshi, Lamirada; Akira Goto, Fullerton, both of Calif.; Tsuyoshi Murakami; Masao Takasaka, both of Hamamatsu, Japan; Yoshiki Shinohara, Hamamatsu, Japan

[73] Assignee: Suzuki Motor Company Limited, Kamimura, Japan

[21] Appl. No.: 462,236

[22] Filed: Jan. 31, 1983

[30] Foreign Application Priority Data

| Feb. 5, 1982 [JP] | Japan | 57-017324 |
| Feb. 6, 1982 [JP] | Japan | 57-017768 |
| Nov. 13, 1982 [JP] | Japan | 57-199640 |
| Nov. 13, 1982 [JP] | Japan | 57-199641 |

[51] Int. Cl.$^3$ .................... B62J 15/00; B62K 5/00; B62K 11/02
[52] U.S. Cl. ..................... 180/311; 180/215; 180/89.1; 280/282
[58] Field of Search ............ 180/215, 216, 217, 210, 180/219, 311, 89.1; 280/282, 269, 268, 267, 281 R

[56] References Cited

U.S. PATENT DOCUMENTS

| 4,065,144 | 12/1977 | Winchell | 180/217 X |
| 4,070,032 | 1/1978 | Cunningham | 280/282 X |
| 4,165,094 | 8/1979 | Onda | 280/282 X |
| 4,226,296 | 10/1980 | Higaki | 280/281 R |
| 4,325,562 | 4/1982 | Yamada et al. | 180/215 X |
| 4,392,536 | 7/1938 | Iwai et al. | 280/282 |

Primary Examiner—John A. Pekar
Attorney, Agent, or Firm—Holman & Stern

[57] ABSTRACT

A new and unique saddle-riding type motorcar having four wheels comprising two front wheels and two rear wheels, wherein each of the front and rear wheels has a balloon tire mounted thereon and only the front wheels are rotatably supported on axles in such a manner as to turn in both directions relative to the longitudinal axis of the motorcar and the latter is steered by steering the front wheels by means of a bar handle constituting a steering mechanism. The motorcar includes a frame structure comprising a pair of upper frames, a pair of lower frames and a plurality of spacer frames, said pair of upper frames comprising a pair of fore-end portions extending downward from a bent portion at a forward inclination angle and a pair of inclined portions extending rearward by a certain distance from said bent portion at a gentle downward slope, said pair of lower frames being fixedly connected to the pair of upper frames by way of a fore axle at their fore end and by way of vertically extending frames at their rear end and said spacer frames extending in the transverse direction relative to the upper and lower frames so as to connect one of the upper frames to the other and one of the lower frames to the other. A steering head is located at the bent portion of the upper frames. Supporting sections are disposed at both the end-parts of the fore axle and at the rearmost end-parts of the lower frames to support the wheels. A suspension mechanism may be disposed at least on one of the front wheels and the rear wheels and each of the rear wheels may include an independent driving axle adapted to be swingably supported by means of an independent swing arm and an independent suspension mechanism.

13 Claims, 14 Drawing Figures

SADDLE RIDING TYPE MOTORCAR HAVING FOUR WHEELS

BACKGROUND OF THE INVENTION

1. Field of the Invention

The present invention relates to a saddle riding type motorcar having four wheels comprising two front wheels and two rear wheels which assures remarkable improvement in maneuverability.

2. Description of the Prior Art

As is well known, a vehicle specially designed for running on the rugged ground or land is required to keep its body in the well-balanced state while it runs thereon with a driver riding on it. In view of the above requirement motorcars having three wheels have been hitherto used widely which essentially comprise a modification from the conventional motorcycles. However, it has been found that the conventional three wheel type motorcars have a drawback of reduced stability of the body caused by displacement of the dead weight of the driver at the time of quick turn.

On the other hand, the conventional four wheel type motorcars are designed to use a circular handle or an aircraft handle for operating a steering mechanism and a sitting type seat as a seat and thereby it becomes difficult to carry out quick turns with accompanying displacement of the dead weight of the driver accompanied and moreover keep the body of the motorcars in the well-balanced stage.

It is particularly important to mount a suspension mechanism on the vehicles specially designed for running on rugged ground or land in order to assure stable maneuverability during their operation. It has been often found that when either or both of the left and right wheels is subjected to shock due to ruggedness on the ground or land during running or driving, the conventional vehicles tend to incline because any shock imparted to the wheel is transmitted directly to the body, thus resulting in reduced operative stability during running or driving.

BRIEF SUMMARY OF THE INVENTION

Hence, the present invention is intended to obviate the drawbacks as described above with respect to the conventional vehicles or motorcars specially designed for running or driving on rugged ground or land.

It is an object of the present invention to provide a saddle riding type motorcar having four wheels which assures remarkable improvement in maneuverability and operative stability.

It is another object of the present invention to provide a frame structure for the saddle riding type motorcar an which it is easy to mount an engine and other associated parts and components in the space defined by the frame structure, is compact in dimension and has excellent mechanical strength.

To accomplish the above objects there is proposed in accordance with the present invention a saddle riding type motorcar having four wheels comprising two front wheels and two rear wheels which is characterized in that each of the front and rear wheels has a balloon tire mounted thereon and only the front wheels are rotatably supported on axles in such a manner as to turn in both directions relative to the longitudinal axis of the motorcar and that the latter is steered by steering the front wheels by means of a bar handle constituting a steering mechanism.

Further, there is proposed in accordance with another aspect of the present invention a saddle riding type motorcar having four wheels comprising two front wheels and two rear wheels which is characterized in that the motorcar includes a frame structure comprising a pair of upper frames, a pair of lower frames and a plurality of spacer frames, said pair of upper frames comprising a pair of fore end portions extending downward from a bent portion at a forward inclination angle and a pair of inclined portions extending rearward by a certain distance from said bent portion at a gentle downward slope, said pair of lower frames being fixedly connected to the pair of upper frames by way of a fore axle at their fore end and by way of vertically extending frames at their rear end and said spacer frames extending in the transverse direction relative to the upper and lower frames so as to connect one of the upper frames to the other and one of the lower frames to the other, that a steering head is disposed at the bent portion of the pair of upper frames and that front wheel supporting sections are disposed at both the end parts of the fore axles while rear wheel supporting sections are disposed at the rearmost end parts of the lower frames.

In a preferred embodiment of the present invention a suspension mechanism is disposed at least on one of the front wheels and the rear wheels.

Further, in another preferred embodiment of the present invention each of the rear wheels includes an independent driving axle adapted to be swingably supported by means of an independent swing arm and an independent suspension mechanism.

BRIEF DESCRIPTION OF THE DRAWINGS

The above and other objects, features and advantages of the present invention will become more apparent by reading the following description in conjunction with the accompanying drawings wherein.

DETAILED DESCRIPTION

Figure 1:
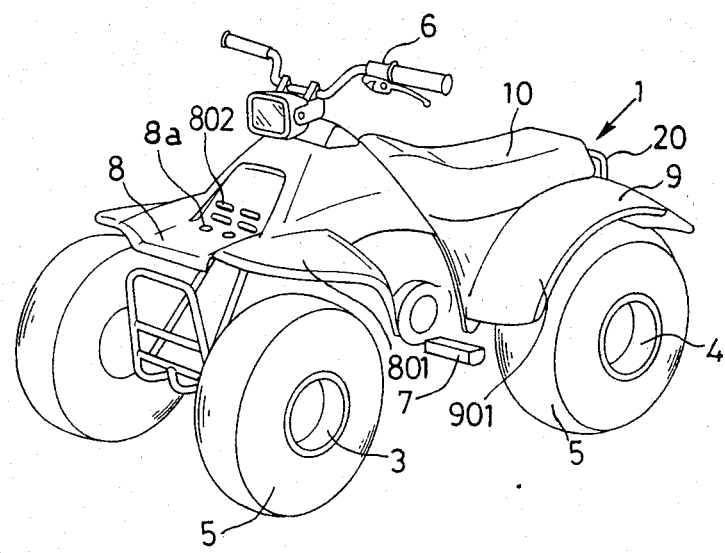
FIG. 1 is a perspective view of a saddle riding type motorcar having four wheels in accordance with an embodiment of the present invention.

Now the present invention will be described in a greater detail with reference to the accompanying drawings which illustrate preferred embodiments of the invention.

First, a saddle riding type motorcar having four wheels in accordance with the first embodiment of the invention will be described particularly with reference to FIGS. 1 to 8.

A saddle riding type motorcar having four wheels (hereinafter referred to merely as motorcar for the purpose of simplification) of the invention is generally identified with reference numeral 1 in FIG. 1. The motorcar 1 includes a frame 2 by means of which two front wheels 3 and two rear wheels 4 are rotatably mounted thereon, as illustrated in FIG. 2. The front wheels 3 are dimensioned in diameter smaller than the rear wheels 4 and both the front and rear wheels 3 and 4 carry special tires 5 that are generally called balloon tires which have reduced pneumatic inner pressure and wide contact surface brought in contact with the ground. As is apparent from FIG. 2, a bar handle 6 is employed as a handle for operating a steering mechanism (to be described later) for the front wheels 3, whereas a bar step 7 is employed as a step on which a foot of a driver is placed. Bar steps 7 are located inward of a line extending between the outermost end part of the front wheel and the outermost end part of the rear wheel.

Reference numeral 8 designates a front cover and reference numeral 9 is a rear cover both of which are to be mounted on the frame 2. A seat 10 is adapted to be mounted on the rear cover 9.

Figure 3:
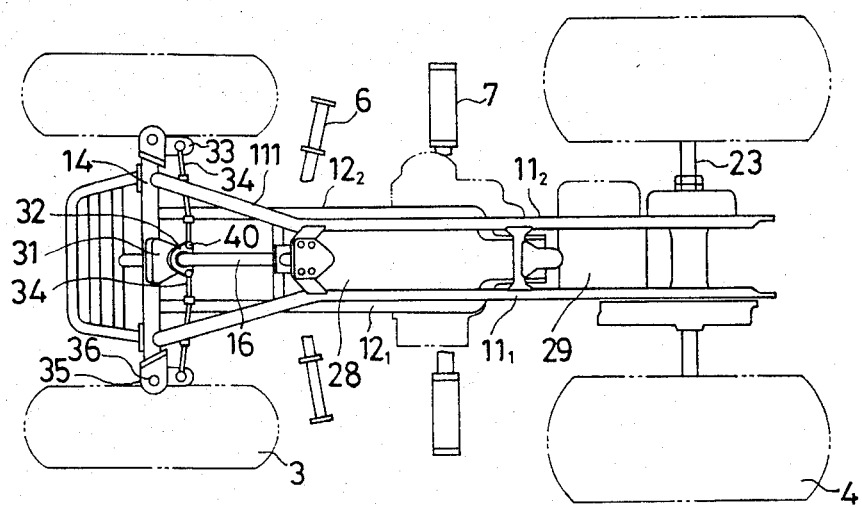
FIG. 3 is a plan view of the motorcar in FIG. 1 with covers, a top seat and other parts removed therefrom for the purpose of simplification.
Figure 4:
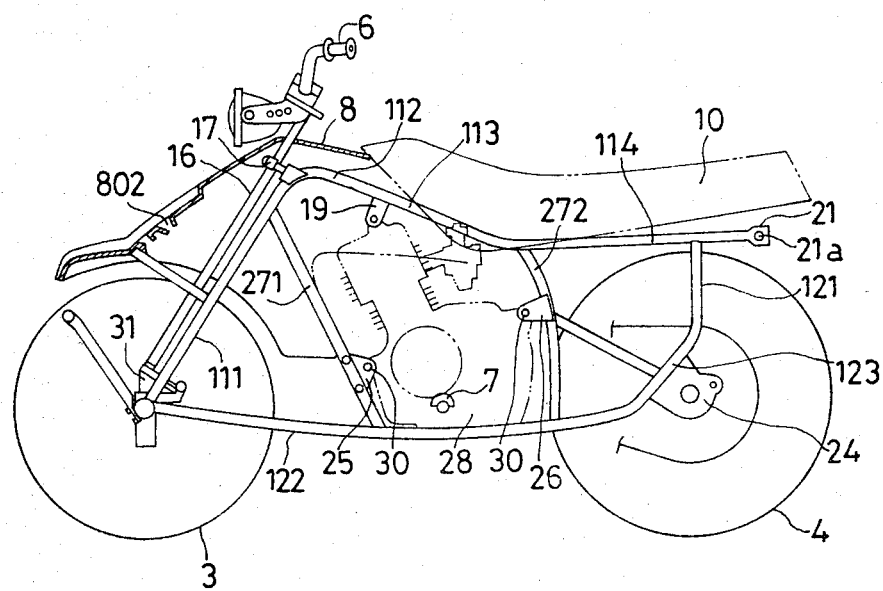
FIG. 4 is a side view of the motorcar in FIG. 1.

Next, the structure of the frame 2 will be described with reference to FIGS. 2 to 4. Specifically, the frame 2 is constructed by a combination of a pair of upper frames $11_1$ and $11_2$, a pair of lower frames $12_1$ and $12_2$ and a plurality of spacer frames 13 which serve to hold the pair of upper frames $11_1$ and $11_2$ and the pair of lower frame $12_1$ and $12_2$ spaced from one another at a certain distance. The pair of upper frames $11_1$ and $11_2$ include three portions, that is, a pair of fore end portions 111, a pair of inclined portions 113 and a pair of rear end portions 114, wherein the pair of fore end portions 111 extend downward from a bent portion 112 at a forward inclination angle in a diverging relation, the pair of inclined portions 113 extend rearward from said bent portion 112 by a certain distance at a gentle downward slope and the pair of rear end portions 114 extend rearward in the horizontal direction or at a slight upward slope from the rear end part of the pair of inclined portions 113. The pair of fore end portions 111 constituting a fore end pair of upper frames $11_1$ and $11_2$ are fixedly connected to a fore axle 14 by welding or the like, and spacer frame 131 is disposed between the pair of fore end portions 111 while a U-shaped attachment frame 15 is bridged therebetween, said U-shaped attachment frame 15 having threaded holes 15a formed at the central part thereof through which set screws are screwed for the purpose of firmly holding the front cover 8 thereon. The bent portion 112 includes a steering head 17 through which a steering shaft 16 rotatably extends downward from the bar handle 6. Further, the pair of inclined portions 113 include upper projections 18 and lower projections 19, each upper projection 18 having a threaded hole 18a formed thereon through which a set screw is screwed for the purpose of firmly securing the front cover 8 to the inclined portions 113 and lower projection 19 having a threaded hole 19a formed therein through which a set screw is screwed for the purpose of fixing an engine to the inclined portions 113. Further, the pair of rear end portions 114 include a spacer frame 132 and projections 21, said spacer frame 132 serving to hold the pair of upper frames $11_1$ and $11_2$ spaced by a constant distance from one another and said projections 21 being located at the rearmost end of the rear end portions 114 and having a threaded hole $21_a$ formed thereon through which a set screw is screwed for the purpose of attaching a rear handle 20 thereto.

On the other hand, the pair of lower frames $12_1$ and $12_2$ are extended in the substantially horizontal direction with a constant distance maintained therebetween in such a manner that their fore end parts are fixedly connected to the front axle 14 and their rear end parts include a bent portion constituting a vertically extending rear end frame 121 the upper end part of which is fixedly connected to one of the rear end portions 114 of the upper frames $11_1$ and $11_2$. Further, the pair of lower frames $12_1$ and $12_2$ include a frame 22 and spacer frames 133 and 134, said frame 22 being located midway of the horizontal part 122 of the lower frames $12_1$ and $12_2$ and extending in the transverse direction so as to carry the bar steps 7 at its outermost ends and said spacer frames 133 and 134 extending therebetween in the transverse direction at the rear part thereof. The bent portion 123 of the lower frames $12_1$ and $12_2$ includes a support 24 through which a driving axle 23 is extended for driving the rear wheels 4. Further, a pair of reinforcement frames 271 are extended between the pair of fore end portions 111 of the upper frames $11_1$ and $11_2$ and the horizontal parts of the lower frames $12_1$ and $12_2$, whereas another reinforcement frame 272 is extended between both the spacer frames 132 and 133. The reinforcement frames 271 each have a projection 25 fixedly secured thereto with a threaded hole $25_a$ formed on said projection 25 respectively, whereas the reinforcement 272 has projections 26 fixedly secured thereto with threaded holes 26a formed on said projections 26. Thus, a space S is defined by a combination of the pair of upper frames $11_1$ and $11_2$, the pair of lower frames $12_1$ and $12_2$ and other frame members so that an engine 28, a fuel tank 29 and other parts are firmly installed therein. The engine 28 is fixedly held within the aforesaid space S with the aid of screws 30 screwed through the projections 19, 25 and 26.

Next, the steering mechanism for steering the front wheels 3 will be described below.

Figure 5:
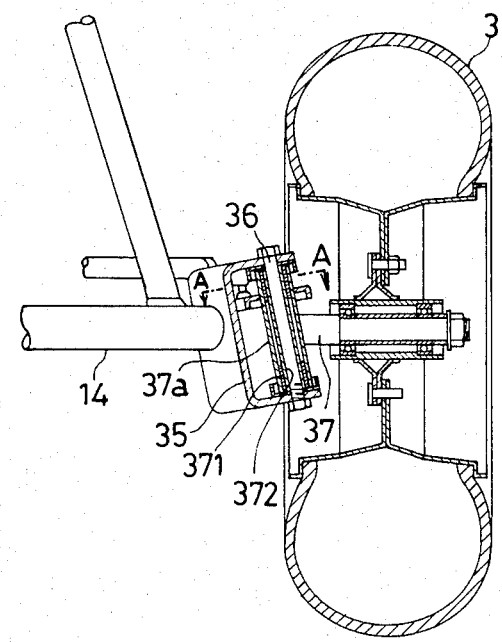
FIG. 5 is a vertical sectional cross-sectional view illustrating how a fore axle is operatively connected to a support axle on which a front wheel is rotatably supported.
Figure 6:
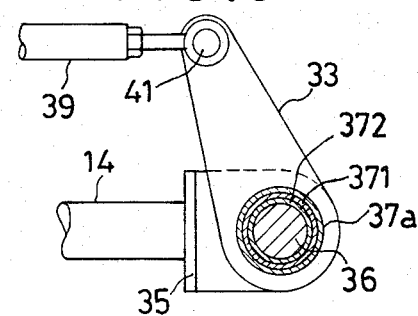
FIG. 6 is a cross-sectional view of a supporting section taken in line A—A in FIG. 5, shown in an enlarged scale.

As illustrated in FIGS. 5 and 6, the front wheels 3 are operatively supported by means of U-shaped frames 35 attached to both the end parts of the fore axle 14 so that they are steered in the required direction. Specifically, supporting of the front wheels 3 is achieved by turnably mounting a support pipe 37a for rotation about a king pin 36 on the U-shaped frame 35, said support pipe 37a being integrated with a wheel support axle 37 on which the front wheel 3 is rotatably mounted. Between the support pipe 37a and the king pin 36 are loosely fitted a spacer 371 and a bush 372.

Figure 7:
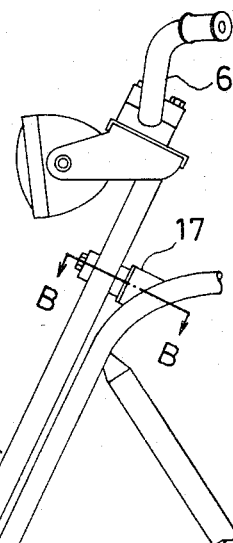
FIG. 7 is a partially cross-sectional side view of a fore part of the frame structure, illustrating how a steering shaft is rotatably supported thereon and is operatively connected to a link mechanism.
Figure 8:
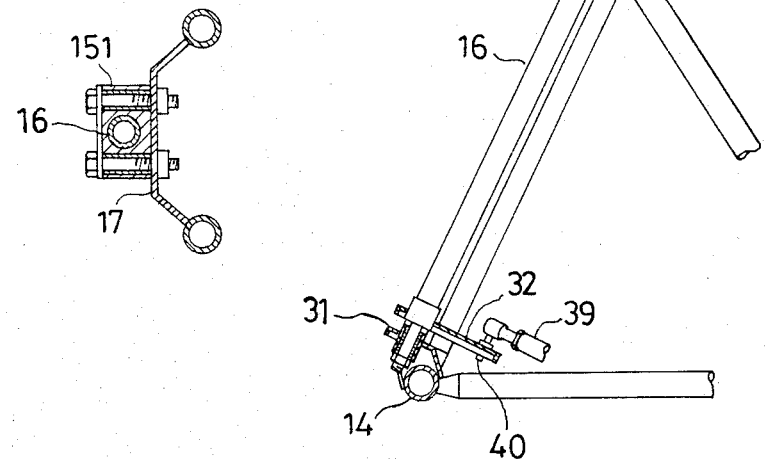
FIG. 8 is a cross-sectional view of a supporting section for the steering shaft taken in line B—B in FIG. 7.

As is apparent from FIGS. 7 and 8, the steering shaft 16 is rotatably supported at its upper end part by means of a member 151 made of plastics, said member 151 being bolted to steering head 17 attached to the bent portion 112 of the upper frames, whereas it is also rotatably supported by means of a supporting section 31 at its lower end port, said supporting section 31 being located above the central part of the fore axle 14. Further, the steering shaft 16 includes an arm 32 at its lowermost end to which one end of both tie rods 39 is pivotally engaged by way of a pin 40. On the other hand, the other end of both the tie rods 39 is also pivotally engaged to an arm 33 which is firmly fitted onto the support pipe 37a for the wheel support axle 37. Thus, the steering shaft 16 is operatively connected to the front wheels 3 by way of a link mechanism 34 whereby they are steered as required by operating the bar handle 6.

In the meanwhile, the rear wheels 4 are supported by means of a driving axle 23 to which power from the engine 28 is transmitted via a power transmission mechanism which is not shown in the drawings.

Figure 2:
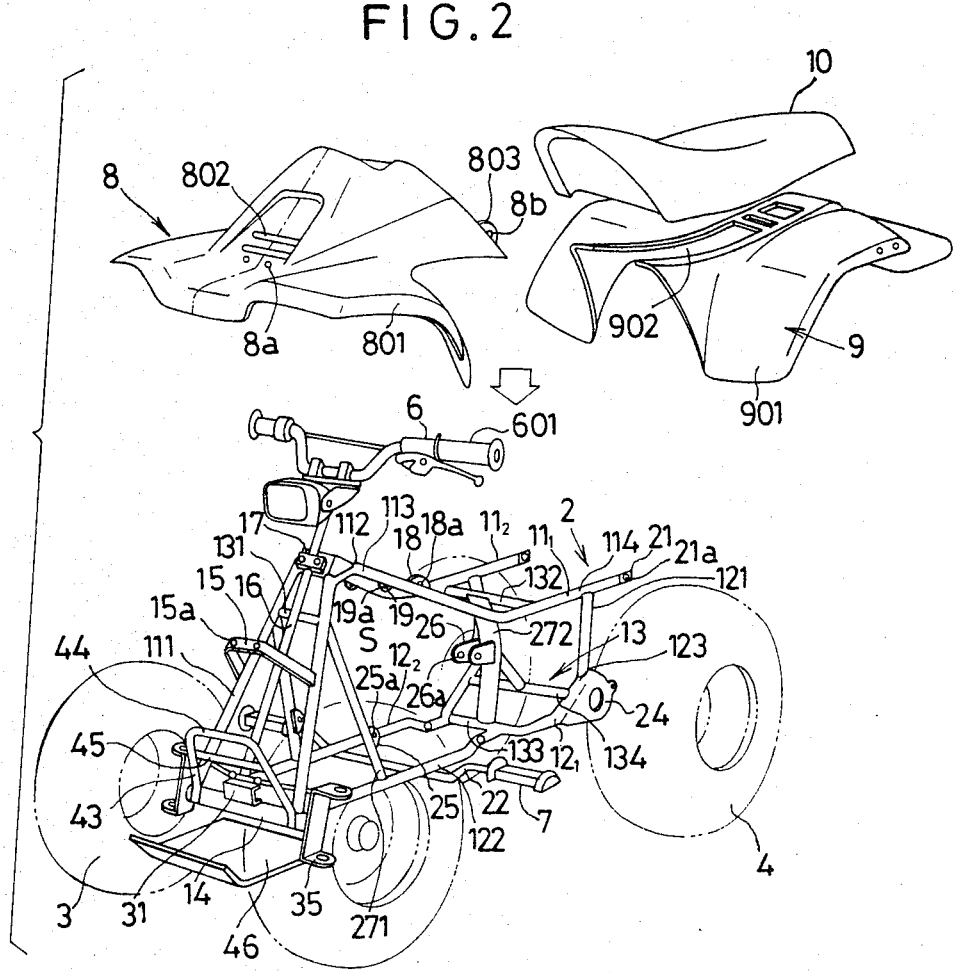
FIG. 2 is a perspective exploded view of the motorcar in FIG. 1 illustrating how the frame structure is constructed.

Next, a cover constituting the outer casing of the body is divided into two parts, that is, the front cover 8 and the rear cover 9 to be combined with the former, as illustrated in FIGS. 1 and 2. The front cover 8 and the rear cover 9 are molded integrally with front fenders 801 and rear fenders 901 respectively. As is best seen in FIG. 2, the front cover 8 has air intake ports 802 and screw holes 8a formed between both the front fenders 801 at the fore part thereof. The front cover 8 is firmly attached to the U-shaped attachment frame 15 by means of set screws inserted through the screw holes 8a and screwed into the threaded holes 15a. Further, the front cover 8 includes projections 803 at its rear part, said projections 803 having a screw hole 8b formed thereon so that they are joined to the upper projections 18 on the inclined portions 113 of the upper frames $11_1$ and $11_2$ by means of set screws inserted through the screw holes 8b and screwed into the threaded holes 18a. On the other hand, the rear cover 9 has a cutout 902 formed on its upper surface so that the engine 28 and the fuel tank 29 located below the cutout 902 can be visually inspected therethrough. The rear cover 9 is fixedly secured onto the pair of upper frames $11_1$ and $11_2$ by means of several set screws screwed at predetermined positions thereon. Finally, the seat 10 is placed on the rear cover 9.

Further, the fore axle 14 includes a bumper 43 for protecting the fore part of the body 1 from damage or injury. The bumper 43 is constructed by a combination of an inverted U-shaped main pipe 44 and a plurality of auxiliary pipes 45 bridged between both the extending leg parts of said main pipe 44. The main pipe 44 serves also as a fore handle by means of which the whole body of the motorcar is lifted in cooperation with the rear handle 20. It should be noted that a protection plate 46 is disposed below the bumper 43 for the purpose of assuring improved safety.

Next, description will be made as to how main parts are attached or mounted on the frame 2.

The steering head 17 and the support section 31 located above the fore axle 14 serve for rotatably supporting the steering shaft 16 with the steering handle 6 fixedly mounted thereon. The engine 28 is firmly mounted within the space S as defined by the upper frames $11_1$ and $11_2$ and the lower frames $12_1$ and $12_2$. Next, the fuel tank 29 is mounted behind the engine 28, whereas a lubricant tank (not shown) is mounted by the side of the engine 28. The front wheels 3 are mounted on the U-shaped frames 35 at both the ends of the fore axle 14 with the aid of the king pin 36 and the front wheels 3 and the steering shaft 16 are operatively connected to one another by way of the link mechanism 34. Next, the driving axle 23 is inserted through the rear supports 24 and the rear wheels 4 are then mounted on both the end parts of the driving axle 23. The front cover 8 is placed on the pair of upper frames $11_1$ and $11_2$ from the front side and the rear cover 9 is placed thereon from the rear side so that the former is fastened thereto by means of set screws screwed into the attachment frame 15 and the upper projections 18 and the latter is fastened thereto by means of set screws screwed into the spacer frame 132 and other members. Then, the seat 10 is placed on the rear cover 9.

On completion of the mounting of these parts and members the motorcar of the invention is assembled on the light and compact frame structure.

Next, operation of the motorcar is described below. An operator or driver rides over the seat 10 and sits down thereon. Then, he places one of his feet on the bar step 7 and grasps both grips 601 by his hands. Now he is ready to start the motor car. When he turns it to the right or to the left or in the reverse direction, he operates the handle 6 toward the required direction in quite the same manner as in ordinary motor cars. As he operates the bar handle 6, the steering shaft 16 is rotated by an angle corresponding to the turn angle of the bar handle and rotation of the steering shaft 16 is then transmitted to the link mechanism 34 by way of the arm 32 whereby the front wheels are steered by the required angle. Thus, the motorcar runs in the different direction. If any quick turn is required, it is necessary that he move himself forward so as to displace his dead weight at the same time when he turns the bar handle 6. This is because of the fact that the forward displacement of his dead weight causes excessive deformation of the balloon tires 5 which is effective in assuring the substantially same functional characteristics as those of the conventional differential gears incorporated in an ordinary motorcar.

Obviously, any foreign material such as stones, gravel, or the like, is prevented by means of the bumper 43 so as not to collide against the fore part of the body during running or driving. Further, the bumper 43 serves as a lift handle for lifting the body for the purpose of changing the orientation of the body.

Figure 9:
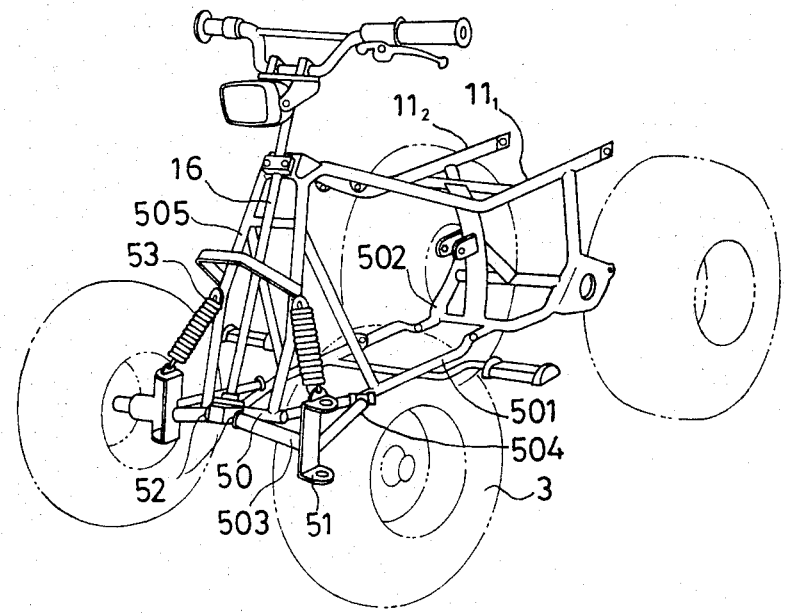
FIG. 9 is a perspective view of a saddle riding type motorcar having four wheels in accordance with another embodiment of the present invention where front suspension mechanism are disposed at the fore part of the frame structure with covers and a seat removed therefrom for the purpose of simplification.
Figure 10:
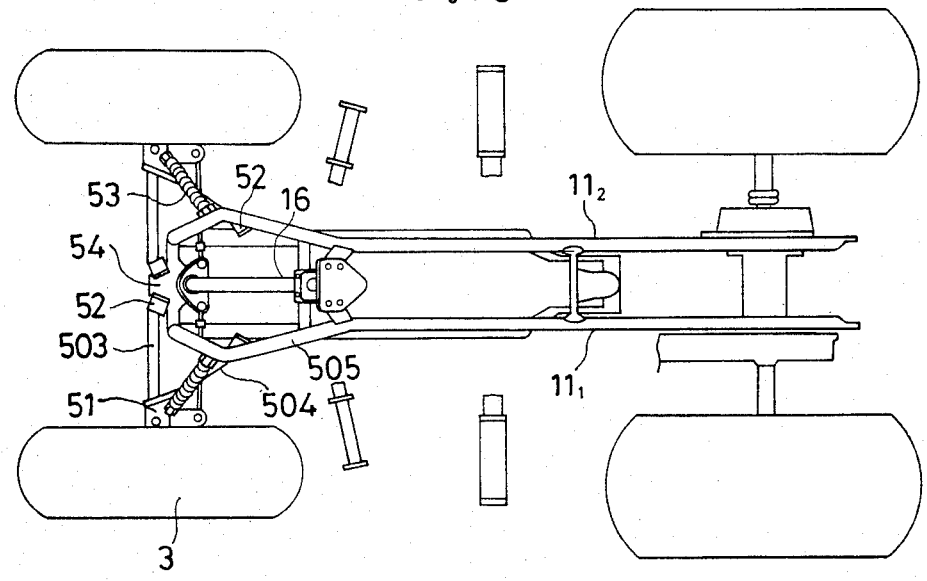
FIG. 10 is a top plan view of the motorcar in FIG. 9.
Figure 11:
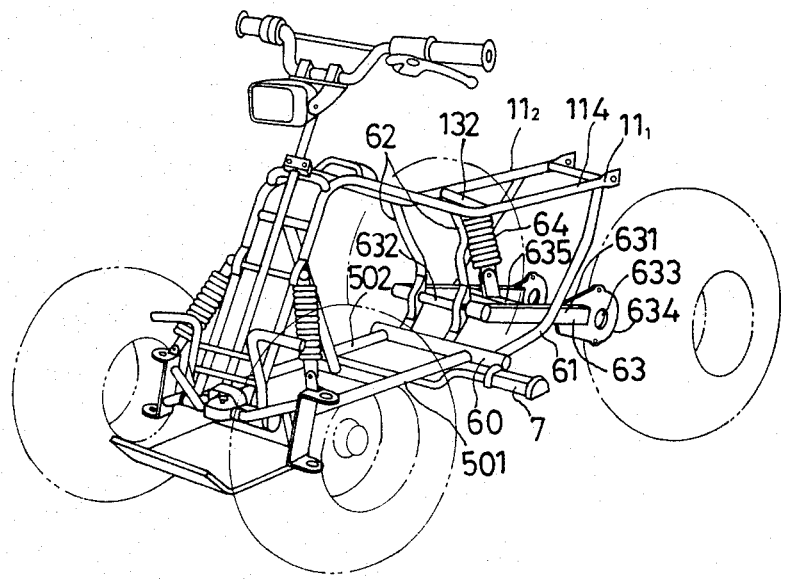
FIG. 11 is a perspective view of a saddle riding type motorcar having four wheels in accordance with another embodiment of the present invention where two front suspension mechanisms and a rear suspension mechanism are disposed on the frame structure also with covers and a seat removed therefrom for the purpose of simplification.

FIGS. 9 to 11 schematically illustrate a motorcar in accordance with the second embodiment of the present invention where suspension mechanisms are incorporated therein. It should be noted that the same or similar parts and members to those in the preceding embodiment are identified with the same reference numeral.

Specifically, FIGS. 9 and 10 illustrate a motorcar with a front suspension mechanism incorporated therein. The front wheels 3 are rotatably supported by means of U-shaped wheel support frames 51 which are in turn held by means of a spacer frame 50 and a pair of lower frames 501 and 502. The spacer frame 50 and the pair of lower frames 501 and 502 include support arms 503 and 504 of which one end part is operatively connected thereto by way of ball joints 52, whereby the support frames 51 are resiliently supported by means of the support arms 503 and 504 and two front suspension mechanisms 53 of which upper end parts are engaged to the fore end portions of the upper frames $11_1$ and $11_2$ at their middle part. The frame 51 and the front wheel 3 are operatively connected to one another in the same manner as in the preceding embodiment. The lowermost end part of the steering shaft 16 is rotatably supported in a supporting section 54 which is disposed in the middle part of the spacer frame 50. The steering mechanism engaged to the lowermost end part of the steering shaft 16 to steer the front wheel 3 is identical to that in the preceding embodiment.

FIG. 11 schematically illustrates a motorcar in accordance with another embodiment modified from FIGS. 9 and 10 where front suspension mechanisms and a rear suspension mechanism are incorporated therein.

The frame structure is designed such that the pair of lower frames 501 and 502 terminate at the position located behind the bar steps 7 and both the rearmost end parts of the lower frames 501 and 502 are connected to one another by means of a joint pipe 60 having a length longer than the distance therebetween. Further, the joint pipe 60 and the rearmost end parts of the upper frames $11_1$ and $11_2$ are connected to one another by means of side frames 61 in such a manner that the distance between the side frames 61 measured across the joint pipe 60 is dimensioned wider than that between the pair of lower frames 501 and 502.

On the other hand, the upper frames $11_1$ and $11_2$ and the joint pipe 60 are connected to one another by means of two main frames 62 to which a support arm 63 is swingably secured for the purpose of supporting the driving axle 23, said swing arm 63 comprising two arms 631 of which foremost end parts are connected to one another by means of a support shaft 632 which extends through the main frames 62 so as to swingably hold the swing arm 63. The arms 631 constituting the swing arm 63 include a supporting section 634 at their rearmost end, said supporting section 634 having a hole 633 formed thereon through which the driving axle 23 extends while it is rotatably supported by means of bearings (not shown) fitted into said holes 633. Between the rear end part of the swing arm 63 and the upper frames $11_1$ and $11_2$ is diaposed a single rear suspension mechanism 64 the upper end of which is connected to a spacer frame 132 extending between the pair of rear end portions 114 of the upper frames $11_1$ and $11_2$ and the lower end of which is connected to a frame 635 extending between the arms 631 of the swing arm 63.

The motorcar as constructed in the above-described manner is equipped with the suspension mechanisms 53 and 64 for the front wheels 3 and the rear wheels 4 respectively, so that a driver can enjoy comfortable riding when the motorcar runs on rugged ground or land.

It should be noted that two rear suspension mechanisms may be provided between the pair of upper frames $11_1$ and $11_2$ and the two arms 631 and alternatively the arms 631 may be separately supported so as to swing about the support shaft so that one rear suspension mechanism 64 is provided between the upper frame $11_1$ and the one arm 631 and another rear suspension mechanism 64 is provided between the upper frame $11_2$ and the other arm 631.

Figure 14:
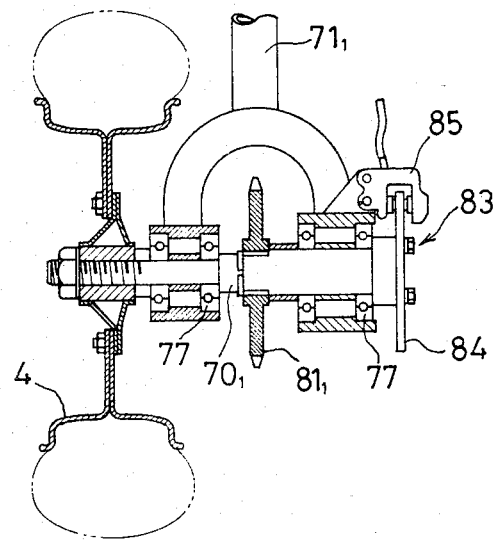
FIG. 14 is a schematic cross-sectional view of a support structure for a driving axle of a rear wheel located at the lowermost end part of a swing arm, shown in an enlarged scale.
Figure 12:
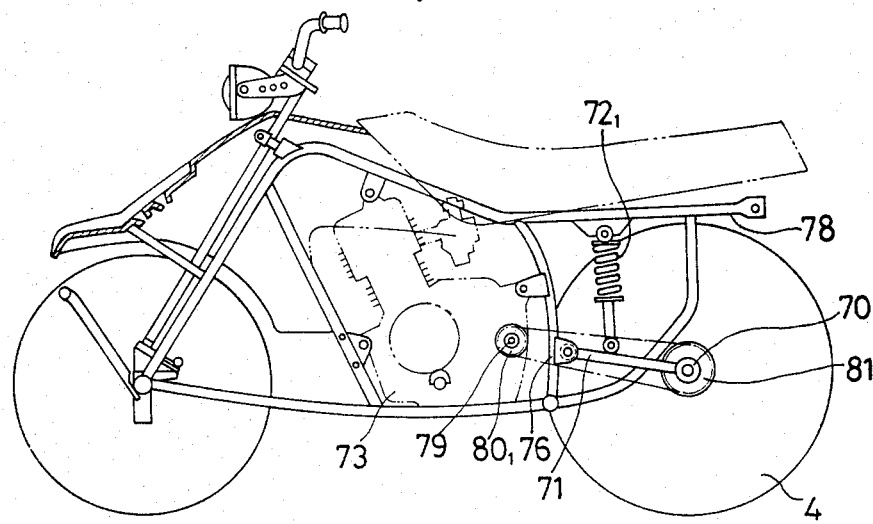
FIG. 12 is a side view of a saddle riding type motorcar having four wheels in accordance with a modified embodiment of the present invention where two rear suspension mechanisms are disposed on the frame structure also with covers and wheels located at the front side as seen in the drawing removed for the purpose of simplification.
Figure 13:
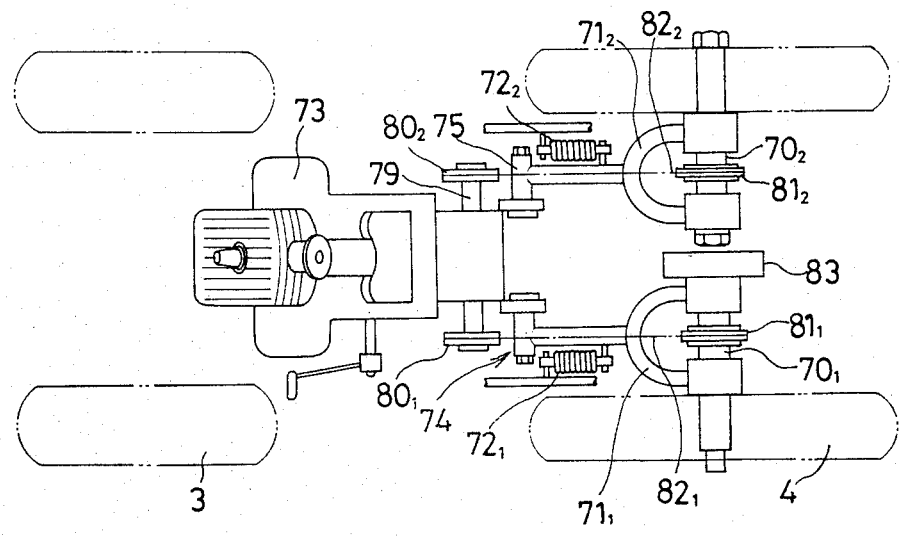
FIG. 13 is a top plan view of the motorcar in FIG. 12.

Next, FIGS. 12 to 14 schematically illustrate a motorcar in accordance with the third embodiment of the present invention where the rear wheels are driven by two separate driving axles each of which is resiliently supported by means of a swing arm and a suspension mechanism.

As is best seen in FIG. 13, the rear wheels 4 are adapted to be driven by means of driving axles $70_1$ and $70_2$ which are separately disposed. The driving axle $70_1$ is resiliently supported by means of a swing arm $71_1$ and a suspension mechanism $72_1$, whereas the driving axle $70_2$ is also resiliently supported by means of a swing arm $71_2$ and a suspension mechanism $72_2$. However, both the driving axles $70_1$ and $70_2$ are driven from a common driving power source by way of a power transmission mechanism 74, said common driving power source being an engine 73 in the illustrated embodiment. The upper end part of the swing arms $71_1$ and $71_2$ is pivotally fitted onto a swing arm pivot 75 which is fixedly secured to a main frame 76 located behind the engine 73. As illustrated in FIG. 14, the driving axles $70_1$ and $70_2$ are rotatably supported in bearings 77 at the lower bifurcated end parts of the swing arms $71_1$ and $71_2$.

On the other hand, the suspension mechanisms $72_1$ and $72_2$ are arranged such that their upper end parts are connected to the rear end portions of the upper frames 78 and their lower end parts are connected to the swing arms $71_1$ and $71_2$ at the position located midway thereof so that the rear wheels 4 are supported and driven separately.

The power transmission mechanism 74 is constructed by a combination of a pair of sprockets $80_1$ and $80_2$ fixedly mounted on an output shaft 79 to which driving power is extracted from the engine 73, said sprockets $80_1$ and $80_2$ having the same number of teeth, sprockets $81_1$ and $81_2$ fixedly mounted on the driving axles $70_1$ and $70_2$, said sprockets $81_1$ and $81_2$ having the same number of teeth, and two endless chains $82_1$ and $82_2$ spanned between the sprockets $80_1$ and $80_2$ and the sprockets $81_1$ and $81_2$.

Reference numeral 83 designates a disc brake disposed at the inner end of the one driving axle $70_1$. The disc brake 83 is actuated when a caliper 85 at one of the bifurcated end parts of the swing arm $71_1$ is brought in pressure contact with a disc plate 84 attached to the inner end of the driving axle $70_1$.

Next, operation of the motorcar in accordance with this embodiment will be described below.

As the engine 73 is operated, power output is transmitted to the output shaft 79 therefrom and thereby both the sprocket $80_1$ and $80_2$ are rotated simultaneously. Rotation of the sprockets $80_1$ and $80_2$ is then separately transmitted to the sprockets $81_1$ and $81_2$ via the endless chains $82_1$ and $82_2$. As the sprockets $81_1$ and $81_2$ are rotated, the driving axles $70_1$ and $70_2$ are separately driven and thereby the rear wheels 4 fixedly mounted on the driving axles $70_1$ and $70_2$ are rotated simultaneously. When one of the rear wheels 4 is subjected to shock caused by ruggedness on the ground during running, it is caused to vibrate but vibration can be effectively absorbed with the aid of the suspension mechanism $72_1$ or $72_2$. Since any shock transmitted to the one rear wheel 4 is absorbed in that way, it is not transmitted to the other rear wheel 4, thus resulting in the body of the motorcar being held in the stable posture.

When braking is required during running or driving, the disc brake 83 is actuated and thereby the caliper 85 comes in pressure contact with the disc plate 84 until the driving axle $70_1$ stops its rotation. The thus imparted braking force is transmitted from the driving axle $70_1$ to the power output shaft 79 via the sprocket $81_1$, the endless chain $82_1$ and the sprocket $80_1$ and it is then transmitted further from the power output shaft 79 to the driving shaft $70_2$ via the sprocket $80_2$, the endless chain $82_2$ and the sprocket $81_2$, whereby the rear wheels 4 come to a stop.

In the above-mentioned few embodiments the present invention has been described merely with respect to a motorcar having four wheels. However, the present invention should be not limited only to the four wheel type but it may be applied to a motorcar having three wheels without any reduction in functional effect. Further, a means for driving the rear wheels 4 should not be limited only to a chain driving mechanism. Alternatively, a shaft driving mechanism may be employable. With respect to a braking mechanism both the driving axles $70_1$ and $70_2$ may be equipped with their own braking mechanism.

As will be readily understood from the above description, the motorcar of the present invention has the following advantages.

Since the motorcar is constructed such that it includes two front wheels and two rear wheels each of which comprises a balloon tire and it is steered by steering the front wheels with the aid of a steering mechanism including a bar handle, an improved operative stability is assured, compared with a three wheel type motorcar and moreover it is possible to carry out quick turns owing to functional characteristics specific to balloon tires. Further, since a driver operates the motorcar by means of a bar handle and bar steps while he rides on a saddle-shaped seat, he can steer it as he does a motorcycle and moreover it is easy to displace his body as required at the time of quick turn or the like operation. Further, since the steering mechanism is designed in the form of a link mechanism, the front wheels can be easily steered without necessity for changing the orientation of the wheel axle. Furthermore, since a bumper serving also as a lift handle for the front wheels is fixedly secured to the axle, the body is protected from foreign material such as stone, gravel or the like which tends to collide against the fore part of the body if no bumper is disposed. Furthermore, since the front cover has air intake ports formed on the fore part thereof intermediate the front fenders, an increased engine cooling efficiency is assured during running of the motorcar.

Since the cover is divided into two parts, that is, a front cover and a rear cover, mounting and dismounting are easy to be effected. In addition maintenance service for an engine and other associated parts can be easily practiced.

Further, owing to the frame structure constructed in accordance with the invention the motorcar is light in weight, compact in dimension and has sufficient strength.

Further, since the motorcar of the invention is equipped with at least a suspension mechanism at the fore or rear axle, a driver can enjoy comfortable riding even when it runs over rugged ground or land.

Furthermore, since the motorcar of the invention has an independent driving axle for both the rear wheels which is adapted to be individually supported by means of a swing arm and a suspension mechanism and thereby any shock imparted to one of the rear wheels can be completely absorbed with the aid of the corresponding suspension mechanism, the body of the motorcar has an improved operative stability during running or driving.

We claim:

1. A saddle riding type motorcar having four wheels comprising:
   two front wheels and two rear wheels;
   a frame structure comprising a pair of upper frames, a pair of lower frames and a plurality of spacer frames;
   said pair of upper frames comprising a pair of fore end portions extending downward from a bent portion of each upper frame at a forward inclination angle and a pair of inclined portions extending rearward a certain distance at a gentle downward slope;
   said pair of lower frames being fixedly connected to the pair of upper frames by a fore axle at their fore ends and by vertically extending frames at their rear ends;
   said spacer frames extending in the transverse direction relative to the upper and lower frames and connecting one of the upper frames to the other upper frame and one of the lower frames to the other lower frame;
   a steering head disposed at said bent portion of the upper frames;
   front wheel supporting sections disposed at both the end parts of the fore axle; and
   rear wheel supporting sections disposed at the rearmost end parts of the lower frames.

2. A saddle riding type motorcar as defined in claim 1, and further comprising:
   an enging mounting area and a fuel tank mounting area provided in the space defined by both the upper frames and the lower frames;
   a front cover fixedly mounted on the fore part of the upper frames;
   a rear cover fixedly mounted on the rear part of the upper frames;
   attachment means for attaching said covers to said upper frames; and
   a seat placed on said rear cover.

3. A saddle riding type motorcar as defined in claim 2, and further comprising:
   front fenders located at both sides of said front cover; and
   air intake ports formed on the fore part of the front cover at the middle area located between said fenders.

4. A saddle riding type motorcar as defined in claim 2, wherein said front cover is molded integrally with the front fenders; and
   further comprising rear fenders located at both sides of said rear cover and molded integrally therewith.

5. A saddle-riding motorcar having four wheels comprising:
   a frame having upper and lower portions;
   two front wheels and two rear wheels mounted on the right and left sides of the frame;

balloon tires fitted on each wheel having a large width for travelling on rough roads;
a seat mounted lengthwise substantially in the center of the upper portion of the frame;
an engine mounted on the frame below said seat for driving the rear wheels;
a fore axle mounted on the frame;
means for mounting said front wheels on the opposite ends of said fore axle so that they can be moved with respect to the frame for steering the motorcar;
a steering shaft operatively mounted on the frame having an upper and a lower end;
a handlebar mounted at the upper end of said steering shaft;
an arm fixedly attached to each front wheel;
a steering shaft arm on the lower end of said steering shaft;
a link mechanism operatively connecting each front wheel arm to said steering shaft arm so that operation of said steering shaft steers the motorcar; and
a bar-type footstep mounted at each side of the frame between said front and rear wheels so that the main part thereof is positioned on the locus of the front tires, and the outer end of each step is positioned inside a line connecting the outer sides of said front and rear wheels.

6. A saddle-riding motorcar as claimed in claim 5 wherein:
said means for mounting said front wheels on the ends of said fore axle comprises a kingpin system for rotatably supporting the front wheels.

7. A saddle-riding motorcar as claimed in claim 5 wherein:
the diameter of said front wheels is smaller than the diameter of said rear wheels.

8. A saddle-riding motorcar as claimed in claim 5 wherein:
the tread of said rear tires is larger than the tread of said front tires.

9. A saddle-riding motor car as claimed in claim 5 and further comprising:
a suspension mechanism is operatively provided on at least one of said front and rear wheels.

10. A saddle-riding motorcar as claimed in claim 5 and further comprising:
an independent driving axle on which each rear wheel is mounted;
individual swing arms operatively supporting each driving axle; and
individual suspension mechanisms operatively connecting said swing arms to the frame.

11. A saddle-riding motorcar as claimed in claim 5 and further comprising:
a bumper fixedly attached to said fore axle and adapted to serve as a lifting handle for the motorcar.

12. A saddle-riding motorcar as claimed in claim 5 and, further comprising:
a front cover mounted on the frame having right and left front fenders integral therewith.

13. A saddle-riding motorcar as claimed in claim 12 and further comprising:
air inlet means in the front surface of said front cover between said front fender.

* * * * *